Nov. 13, 1923.
C. B. WILLIAMS
BOTTLE CARRIER
Filed Oct. 21, 1922
1,474,305
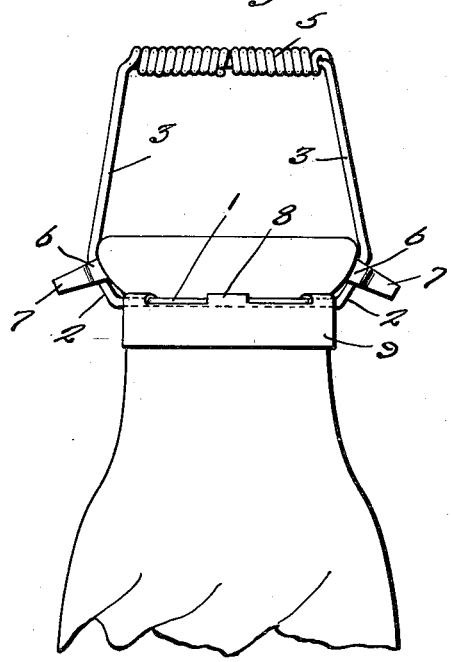
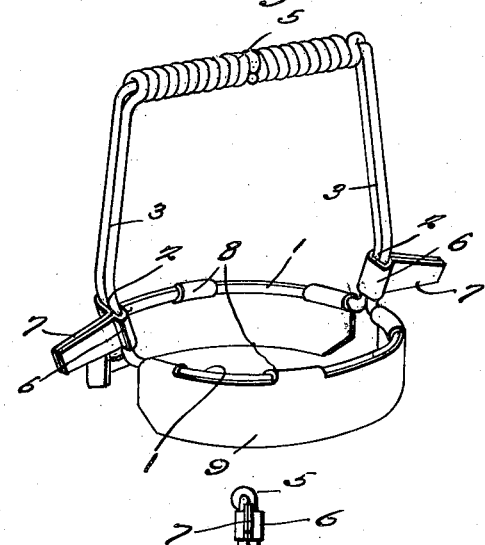
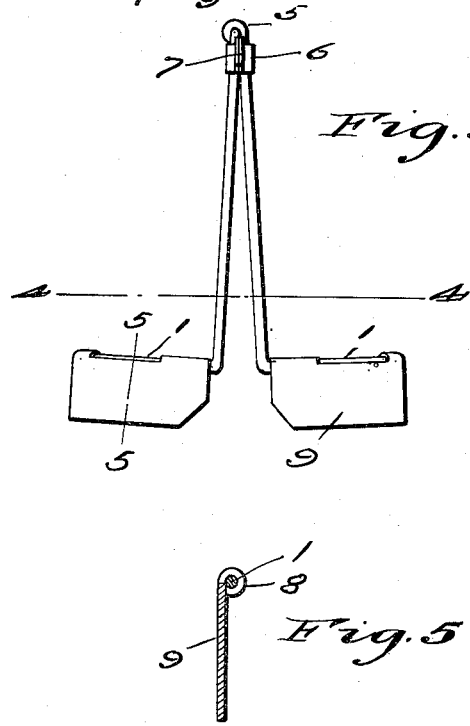
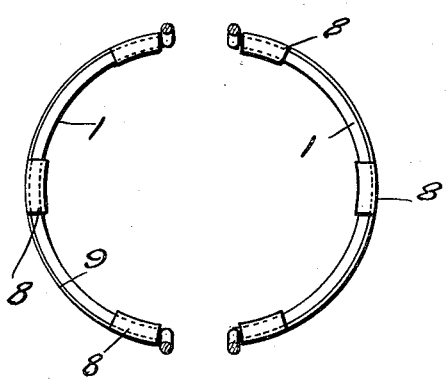
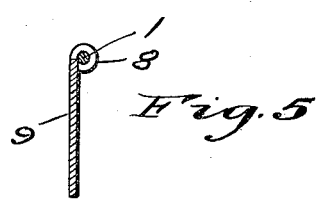
C. B. Williams INVENTOR
BY Victor J. Evans ATTORNEY
WITNESSES Patented Nov. 13, 1923.

1,474,305

UNITED STATES PATENT OFFICE.

CLARENCE B. WILLIAMS, OF ST. PETERSBURG, FLORIDA.

BOTTLE CARRIER.

Application filed October 21, 1922. Serial No. 596,059.

*To all whom it may concern:*

Be it known that I, CLARENCE B. WILLIAMS, a citizen of the United States, residing at St. Petersburg, in the county of Pinellas and State of Florida, have invented new and useful Improvements in Bottle Carriers, of which the following is a specification.

An object of this invention is to produce a device whereby the neck of a bottle can be effectively gripped to permit of the bottle being conveyed, and when arranged at its destination, readily removed from the holder.

A further object is to produce a bottle holder or carrier comprising a pair of semi-circular jaws having arms extending from the ends thereof and having a handle portion connecting the outer ends of the arms, the same being in the nature of a coiled spring which has a tendency to force the arms of the respective jaws away from each other, while slidable on the confronting pairs of arms are sleeves which, when moved to one position, will cause the jaws to effectively grip the bottle neck and when moved in the direction of the handle will permit of the jaws being spread away from each other to release the bottle.

To the attainment of the foregoing, and other objects which will present themselves as the nature of the invention is better understood, reference is to be had to the drawing which accompanies and forms part of this specification.

In the drawing:—

Figure 1 is an elevation of a portion of a bottle with the invention applied thereto.

Figure 2 is a perspective view of the invention removed from the bottle, the jaws thereof being in closed position.

Figure 3 is a side elevation showing the jaws in spread position.

Figure 4 is a detail sectional view on the line 4—4 of Figure 3.

Figure 5 is a sectional view on the line 5—5 of Figure 3.

The main or body portion of the improvement is preferably formed from a single strand of wire which, of course, has a natural resiliency. Each strand is rounded upon itself to provide a jaw portion 1, and each jaw portion is of a less circumference than that of a semi-circle. The opposed rounded jaws 1 have their ends outwardly extended, as at 2, and from thence arranged at an inward angle, as at 3. The ends of the arms are extended inwardly, being coiled upon themselves to provide the handle portion 5, the coils of the said handle also adding to the resiliency of the arms to cause the opposed arms of the respective jaws to assume an outward angle with respect to each other, and consequently sustain the jaws in open position. When in such position, it will be noted that the jaws may be readily arranged over the mouth of a milk or similar bottle, below the beaded portion of the neck thereof.

To move the jaws toward each other, there are arranged on each of the opposed arms thereof slidable sleeves 6. Each of the sleeves is provided with an outwardly extending portion forming a finger hold 7. When the jaws are opened, the sleeves are arranged adjacent to the handle 5, and it will be apparent that the operator by pressing upon the finger holds will move the sleeves downwardly or in the direction of the jaws, and after the said sleeves pass over the inwardly inclined portions 3 of the arms and are positioned over the outwardly inclined portions 2 of the said arms, the sleeves will be retained in locked position and consequently the jaws will be likewise locked. It will be further apparent that the operator resting his hand on the handle 5 and permitting his fingers to grip the under edges of the finger hold 7, the sleeves 6 may be slid on the limbs or arms of the device into contacting engagement with the handle, when the spring arms will cause the release of the jaws.

Preferably, I arrange over each jaw, the beaded edge 8 of a metal plate 9, the plate, of course, assuming a cross sectional rounded segmental shape when so positioned. The arcuate plates 9 may grip the outer surface of the beaded mouth of the bottle, or may be brought to effectively grip with the neck thereof below the bead, and it is thought that the foregoing description, when taken in connection with the drawing will fully set forth the construction and advantages thereof, it being understood, of course, that the invention is susceptible to such various changes as fall within the scope of the claims without departing from the spirit thereof.

Having described the invention, I claim:—

1. A bottle or similar holding and conveying device comprising opposed jaws, angle arms extending from the ends of the jaws, a coiled handle connected with the arms and designed to normally move the arms of the opposed jaws away from each other to spread the jaws to open position, and slidable means on said arms for forcing the same together and bringing the jaws to closed position.

2. A bottle holding and conveying device constructed from a single strand of spring wire to include opposed outwardly rounded jaws, arms extending from the ends of the jaws, the ends of the arms being directed toward each other and being coiled to provide a handle, and said coils designed to exert a spring pressure against the arms to force the jaws away from each other, means slidable on the arms for forcing the same together, and said arms being so shaped to hold the slidable means in locked position when the jaws are in gripping position.

3. A bottle holding and conveying device constructed from a single strand of spring wire to include opposed outwardly rounded jaws, arms extending from the ends of the jaws, the ends of the arms being directed toward each other and being coiled to provide a handle, and said coils designed to exert a spring pressure against the arms to force the jaws away from each other, means slidable on the arms for forcing the same together, and said arms being so shaped to hold the slidable means in locked position when the jaws are in gripping position, and an arcuate plate secured to and depending from each jaw.

4. A bottle holding and conveying device formed from a single strand of spring wire, shaped to include opposed outwardly curved jaws, said jaws having their ends extended at an outward angle and from thence extended at an inward angle and directed toward each other, said last mentioned portions being coiled to provide a handle designed to impart an added resiliency to the arms to spread the jaws away from each other, a sleeve slidable on the confronting arms of each jaw, an outwardly extending finger held on each sleeve, and an arcuate plate secured to each jaw and extending outwardly therefrom.

In testimony whereof I affix my signature.

CLARENCE B. WILLIAMS.